United States Patent
Tsoukaneri et al.

(10) Patent No.: US 11,357,057 B2
(45) Date of Patent: Jun. 7, 2022

(54) RANDOM ACCESS IN A TELECOMMUNICATION SYSTEM

(71) Applicant: Samsung Electronics Co., Ltd., Suwon-si (KR)

(72) Inventors: Galini Tsoukaneri, Middlesex (GB); Yue Wang, Middlesex (GB); Shangbin Wu, Middlesex (GB)

(73) Assignee: Samsung Electronics Co., Ltd., Suwon-si (KR)

(*) Notice: Subject to any disclaimer, the term of this patent is extended or adjusted under 35 U.S.C. 154(b) by 103 days.

(21) Appl. No.: 16/790,468

(22) Filed: Feb. 13, 2020

(65) Prior Publication Data

US 2020/0288505 A1 Sep. 10, 2020

(30) Foreign Application Priority Data

Feb. 13, 2019 (GR) .............................. 20190100071
Jan. 16, 2020 (GB) .................................... 2000653

(51) Int. Cl.
*H04W 74/08* (2009.01)
*H04W 76/10* (2018.01)

(52) U.S. Cl.
CPC ....... *H04W 74/0833* (2013.01); *H04W 76/10* (2018.02)

(58) Field of Classification Search
CPC .......................... H04W 74/0833; H04W 76/10
USPC ....................................................... 370/329
See application file for complete search history.

(56) References Cited

U.S. PATENT DOCUMENTS

| | | | |
|---|---|---|---|
| 10,425,968 B2 | 9/2019 | Qian et al. | |
| 2012/0002567 A1* | 1/2012 | Sun | H04W 28/16 370/252 |
| 2013/0114515 A1* | 5/2013 | Koo | H04J 11/0023 370/329 |
| 2015/0092552 A1 | 4/2015 | Bajj et al. | |
| 2015/0326360 A1 | 11/2015 | Malladi et al. | |
| 2016/0381715 A1 | 12/2016 | Lee et al. | |
| 2018/0077685 A1 | 3/2018 | Wu et al. | |
| 2018/0077733 A1 | 3/2018 | Wu | |

(Continued)

FOREIGN PATENT DOCUMENTS

| | | |
|---|---|---|
| GB | 2553797 A | 3/2018 |
| KR | 10-2012-0023511 A | 3/2012 |

(Continued)

OTHER PUBLICATIONS

Non-Orthogonal Randoln Access (NORA) for 5G Networks, IEEE Transactions on Wireless Communications, vol. 16, No. 7, Jul. 2017 (Year: 2017).*

(Continued)

*Primary Examiner* — Kibrom T Hailu
*Assistant Examiner* — Nizam U Ahmed

(57) ABSTRACT

A Random Access method in a telecommunication system, includes the steps of: receiving two or more identical preambles transmitted from two or more User Equipments (UEs), respectively; determining a minimum difference between the two or more identical preambles in a given domain; transmitting a response message to each of the two or more UEs; and receiving a connection setup message using information included in the respective response messages transmitted to each of the two or more UEs.

16 Claims, 13 Drawing Sheets

(56) References Cited

U.S. PATENT DOCUMENTS

2018/0145855 A1    5/2018  Chaudhuri et al.
2018/0220466 A1    8/2018  Park et al.

FOREIGN PATENT DOCUMENTS

KR    10-2018-0102056 A    9/2018
WO         2017019119 A1   2/2017

OTHER PUBLICATIONS

Notification of Transmittal of the International Search Report and the Written Opinion of the International Searching Authority, or the Declaration dated May 26, 2020 in connection with International Patent Application No. PCT/KR2020/002044, 10 pages.

Liang et al., "Non-Orthogonal Random Access (NORA) for 5G Networks", arXiv, May 3, 2017, 15 pages.

"3rd Generation Partnership Project; Technical Specification Group Radio Access Network; Study on RAN Improvements for Machine-type Communications; (Release 10)", 3GPP TR 37.868 V0.6.1 (Oct. 2010), 27 pages.

European Patent Office, "Supplementary European Search Report" dated Jan. 4, 2022, in connection with European Patent Application No. 20755361.1, 9 pages.

\* cited by examiner

FIG. 5

| preambles | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| cummulative usage | 0.01 | 0.06 | 0.16 | 0.24 | 0.31 | 0.37 | 0.45 | 0.54 | 0.555 | 0.615 | 0.705 | 0.775 | 0.855 | 0.945 | 1 |

FIG. 6

| | |
|---|---|
| AC earring for Emergency Calls | |
| AC Barring for MO Signalling | Barring Factor |
| | Barring Time |
| | Barring for Special AC |
| AC Barring for MO Data | Barring Factor |
| | Barring Time |
| | Barring for Special AC |
| Radio Resource Configuration | RACH Configuration |
| | BCCH Configuration |
| | PCCH Configuration |
| | PRACH Configuration |
| | PDSCH Configuration |
| | PUSCH Configuration |
| | PUCCH Configuration |
| | Uplink Sounding Reference Signal Configuration |
| | Uplink Power Control |
| | Uplink Cyclic Prefix length |
| UE Timers and Constants | T300 |
| | T301 |
| | T310 |
| | N310 |
| | T311 |
| | N311 |
| Frequency Information | Uplink Carrier Frequency |
| | Uplink Bandwidth |
| | Additional Spectrum Emission |
| MBSFN Subframe Configuration List (1 to 8 instances) | Radio Frame Allocation Period |
| | Radio Frame Allocation Offset |
| | Subframe Allocation |
| Time Alignment Timer Common | |
| Extensions | Barring for MMTEL |
| | Barring for CSFB |
| | Barring Skip for MMTEL Voice |
| | Voice Service Cause Indication |
| | Barring for Common |
| | NEW FIELD: Zone Limits |

# RANDOM ACCESS IN A TELECOMMUNICATION SYSTEM

CROSS-REFERENCE TO RELATED APPLICATIONS

This Application is based on and claims priority Under 35 U.S.C. 119 to Greece Patent Application No. 20190100071 filed on Feb. 13, 2019 and United Kingdom Patent Application No. 2000653.2 filed on Jan. 16, 2020, the disclosures of which are herein incorporated by reference in their entireties.

BACKGROUND

1. Field

The present disclosure relates to improvements in a Random Access (RA) process in a cellular telecommunication system or network. It is particularly useful in a Fifth Generation (5G) or New Radio (NR) system, but may be utilized in any suitable telecommunication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

According to a first aspect of the present disclosure Random Access method in a telecommunication system, comprising the steps of: a base station receiving two or more identical preambles transmitted from two or more User Equipments; the base station determining a minimum difference between the two or more preambles in a given domain; the base station transmitting a response message to each of the two or more UE which transmitted the identical preambles; and each of the two or more UEs transmitting a connection setup message to the base station using information included in the respective response message from the base station.

In an embodiment, there is a further step of the base station continuously updating the minimum difference on the basis of the determined minimum difference.

In an embodiment, the given domain is one or more of time, power, frequency or code, In an embodiment, the determined minimum difference is used to define a plurality of logical zones within a coverage area of a cell of the telecommunication system.

In an embodiment, the plurality of logical zones are defined such that preambles from one of plurality of logical zones in the cell coverage area may be reused in another of the plurality of logical zones in the cell coverage area.

In an embodiment, the plurality of logical zones are defined on the basis of a Non Orthogonal Multiple Access, NOMA, scheme utilizing Successive Interference Cancellation, SIC.

In an embodiment, each of the two or more UEs selects a preamble to transmit on the basis of a preamble usage report which is transmitted from the base station periodically.

In an embodiment, the preamble usage report is transmitted in a System Information Block, SIB.

In an embodiment, the preamble usage report is determined based on the number of times that a given preamble has been used in an observing time window.

In an embodiment, a duration of the observing window is adjusted dynamically on the basis of a reinforcement learning algorithm.

According to a second aspect of the present disclosure, there is provided apparatus arranged to perform the method of any preceding aspect.

According to a third aspect of the present disclosure, there is provided a telecommunication system comprising the apparatus of the second aspect.

According to a fourth aspect of the present disclosure, there is provided a method of preamble selection in a Random Access process in a telecommunication system, comprising the steps of: a base station defining an observing window having a duration of a number of frames and recording preamble usage within the observing window; the base station preparing a preamble usage report comprising information regarding a number of times each possible preamble is used within the observing window; the base station transmitting the preamble usage report and a UE selecting a preamble based on a selected random number and the preamble usage report.

In an embodiment, the duration of the observing window is dynamically updated by means of a reinforcement learning algorithm.

Although various embodiments of the present disclosure have been shown and described, it will be appreciated by those skilled in the art that various changes and modifications might be made without departing from the scope of the disclosure, as defined in the appended claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 shows an example of a Preamble Usage Report (PUR) according to an embodiment of the present disclosure;

FIG. 6 shows an example structure of an SIB (SIB2) according to an embodiment of the present disclosure;

DETAILED DESCRIPTION

Figure 1:
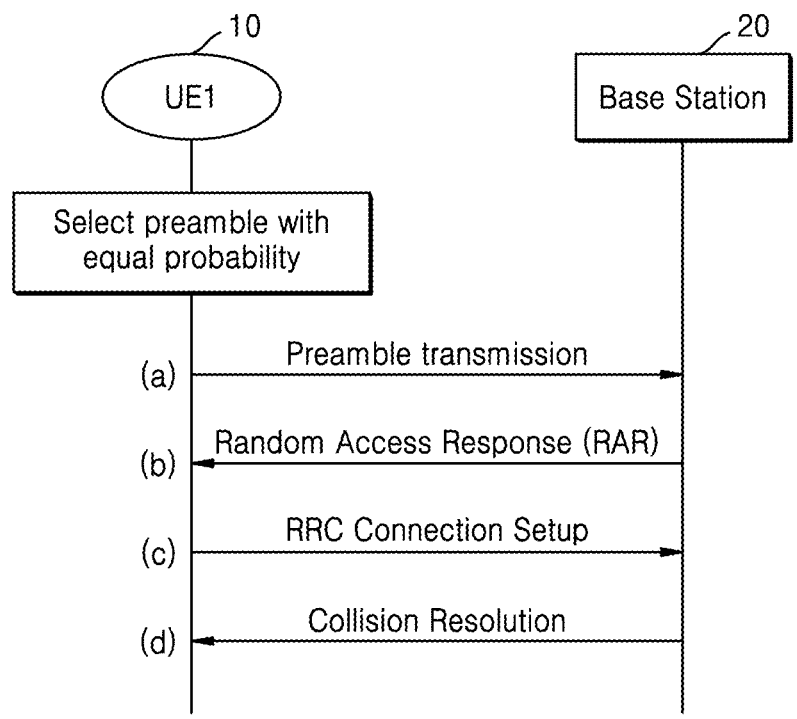
FIG. 1 shows a Random Access procedure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Other technical features may be readily apparent to one skilled in the art from the following figures, descriptions, and claims.

Before undertaking the description below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Various embodiments of the present disclosure recognize a Random Access procedure, such as illustrated in FIG. 1.

The present disclosure relates to improvements in a Random Access (RA) process in a cellular telecommunication system or network. It is particularly useful in a Fifth Generation (5G) or New Radio (NR) system, but may be utilized in any suitable telecommunication system.

In cellular networks, devices or user equipments (UEs) that want to establish a connection and exchange data use a Random Access (RA) process in order to get uplink synchronization and be allocated resources to transmit/receive data.

According to the 3GPP specifications [3GPP36.321], the RA process begins with the transmission of a preamble value on pre-defined frequency and time resources called the Random Access Channel. This is illustrated in step (a) of FIG. 1, which shows a RA process. There are 64 orthogonal preamble values or codewords available in each RACH, and the UE 10 chooses the one to transmit at random and with equal probability. The base station 20 then replies, at step (b) with a Random Access Response (RAR) message to every received preamble. Devices that transmitted a preamble now receive the corresponding RAR which includes a resource allocation to be used for the transmission of an RRC Connection Setup message, step (c). In this message, the UEs include an identifier, which is either a temporary identifier given to the UE by the base station during a previous connection, or a random number if the first is not available.

If two or more UEs transmit the same preamble at the same RACH resource (e.g. time and frequency resource), step (a) then a collision occurs. However it might not be possible for the base station 20 to distinguish between the two transmitting devices at this stage, and thus the RAR message, step (b), is received by all devices that transmitted the corresponding preamble. Such a collision is identified with the transmission of the RRC Connection Setup message, step (c), where the base station 20 will receive multiple such messages, each with a different identifier. To resolve the collision, the base station 20 selects one of the colliding devices and transmits a Collision Resolution message, step (d) that echoes the RRC Connection Setup message of the selected device, including its identifier. Upon reception of the Collision Resolution message, the UEs compare the echoed message with the one they transmitted to determine if they have been selected to proceed with the connection process. The UEs that were not selected back off for a random period of time and start the procedure again at a later time.

The orthogonality of the preamble values decreases the probability that the transmission of one interferes with the transmission of the other, even if they are transmitted on the same resources. However, the limited number of preamble values available in each RACH limits the number of UEs that can connect to the network at the same time. Therefore, with the increasing number of UEs being served by the same base station, the number of collisions also increases, leading to increased network access delays and degradation of the system's performance.

Non-Orthogonal Multiple Access (NOMA) schemes have been proposed to help alleviate the increased number of collisions in the RACH, and this technique is currently considered by 3GPP for the cases of massive Machine Type Communication (mMTC) scenarios. NOMA uses the power domain for multiple access (instead of the time/frequency/code domain), where signals from different transmitters (in this case, the preambles) are separated using successive interference cancellation (SIC) technology at the receiver (in this case the base station 20). In the SIC technique, a node that receives a signal S that combines signals from multiple transmitters ($s_1, s_2, \ldots, s_n$), attempts to decode the stronger signal first treating the other signals as interference. Once the stronger signal is decoded, it is subtracted from the originally received signal ($S_{new}=S-s_i$). The receiver then attempts to decode the strongest signal of the $S_{new}$, treating the remaining signals as interference. The receiver repeats this process until there are no more signals that it can decode. NOMA schemes that employ the SIC technique allow multiple users to transmit the same preamble on the same resources and still be distinguished at the first step due to the power difference of the transmitted signals. Therefore, NOMA is expected to improve the spectral efficiency of cellular systems and has been proposed as one of the key technologies in 5G networks. Embodiments of the present disclosure aim to address shortcomings in the prior art, whether mentioned herein or not.

According to the present disclosure there is provided an apparatus and method as set forth in the appended claims. Other features of the disclosure will be apparent from the dependent claims, and the description which follows.

According to a first aspect of the present disclosure Random Access method in a telecommunication system, comprising the steps of: a base station receiving two or more identical preambles transmitted from two or more User Equipments; the base station determining a minimum difference between the two or more preambles in a given domain; the base station transmitting a response message to each of the two or more UE which transmitted the identical preambles; and each of the two or more UEs transmitting a connection setup message to the base station using information included in the respective response message from the base station.

In an embodiment, there is a further step of the base station continuously updating the minimum difference on the basis of the determined minimum difference.

In an embodiment, the given domain is one or more of time, power, frequency or code, In an embodiment, the determined minimum difference is used to define a plurality of logical zones within a coverage area of a cell of the telecommunication system.

In an embodiment, the plurality of logical zones are defined such that preambles from one of plurality of logical zones in the cell coverage area may be reused in another of the plurality of logical zones in the cell coverage area.

In an embodiment, the plurality of logical zones are defined on the basis of a Non Orthogonal Multiple Access, NOMA, scheme utilizing Successive Interference Cancellation, SIC. In more detail, the plurality of logical zones are defined on at least one of a Non Orthogonal Multiple Access (NOMA) and/or scheme utilizing Successive Interference Cancellation (SIC).

In an embodiment, each of the two or more UEs selects a preamble to transmit on the basis of a preamble usage report which is transmitted from the base station periodically.

In an embodiment, the preamble usage report is transmitted in a System Information Block, SIB.

In an embodiment, the preamble usage report is determined based on the number of times that a given preamble has been used in an observing time window.

In an embodiment, a duration of the observing window is adjusted dynamically on the basis of a reinforcement learning algorithm.

According to a second aspect of the present disclosure, there is provided apparatus arranged to perform the method of any preceding aspect.

According to a third aspect of the present disclosure, there is provided a telecommunication system comprising the apparatus of the second aspect.

According to a fourth aspect of the present disclosure, there is provided a method of preamble selection in a Random Access process in a telecommunication system, comprising the steps of: a base station defining an observing window having a duration of a number of frames and recording preamble usage within the observing window; the base station preparing a preamble usage report comprising information regarding a number of times each possible preamble is used within the observing window; the base station transmitting the preamble usage report and a UE selecting a preamble based on a selected random number and the preamble usage report.

In an embodiment, the duration of the observing window is dynamically updated by means of a reinforcement learning algorithm.

Although various embodiments of the present disclosure have been shown and described, it will be appreciated by those skilled in the art that various changes and modifications might be made without departing from the scope of the disclosure, as defined in the appended claims.

Embodiments of the present disclosure relate to a mechanism in a telecommunication system, to enable a probabilistic preamble selection according to which, UEs do not choose their next preamble at random and with equal probability. Instead, the preamble usage is observed for a period of time defined by the observing window, and Preamble Usage Reports (PURs) are prepared. Based on the PURs, UEs choose the preambles that are expected to result in the lower collision probability. The observing window value is determined with the use of reinforcement learning algorithms and is continuously updated to the value that results in the lower number of collisions. To further increase the efficiency of the system, NOMA/SIC schemes are utilized and the coverage area of a cell is split into different logical zones that are significantly apart either in the time domain, in the power domain or in any other domain in which preamble differentiation can be achieved. In this way, the preambles can be split and re-used among different zones, thus increasing the capacity of the system.

Preamble splitting algorithms have been previously studied in the context of the RA process in an attempt to alleviate the network congestion in the RACH, the number of collisions and decrease the network access delay. Some approaches have attempted to split the preambles between Machine Type Communication (MTC) devices (such as sensors and meters) and Human Type Communication (HTC) devices (such as smartphones and tablets) to limit the impact of the MTC traffic on HTC. However, these approaches may lead to increased collisions and delays for the MTC traffic as it is usually considered of lower priority compared to HTC. Embodiments of the present disclosure make no such separation, and all devices are assumed to be of equal priority.

Embodiments of the present disclosure provide a method for splitting the coverage area of a cell into different logical zones, so that preambles can be reused between different logical zones without the risk of collisions in the RACH. By employing the SIC and NOMA approaches to distinguish preambles that are transmitted in the same cell, UEs that belong to different zones are allowed to use the same preambles without the risk of collisions. Thus, the reuse of the preambles essentially increases the total number of preambles that can be used, thus increasing the capacity of the system.

To further decrease the number of collisions among UEs in the same zone, a probabilistic preamble selection scheme based on reinforcement learning is applied. This scheme observes the preamble usages for a period of time defined by the observing window value to produce preamble usage reports (PURs) for each zone. The UEs then use the PUR of their corresponding zone to select a preamble that has a low probability of colliding. The value of the observing window is dynamically adapted to yield a significantly low number of collisions, using reinforcement learning.

The first step of the algorithm splits the coverage area of a cell into logical zones, so that the preambles can be reused among different logical zones. The limits of the zones can be determined in different ways based on what algorithm is used by the base station to distinguish among different UEs that transmitted the same preamble on the same resources. Essentially, the base station attempts to find the minimum difference either in the time domain ($\Delta t$), or in the power domain ($\Delta P$), or in any other domain ($\Delta x$) or combination of domains in which the signals can be distinguished. Different domains may be combined or treated separately when defining the zones.

Figure 3:
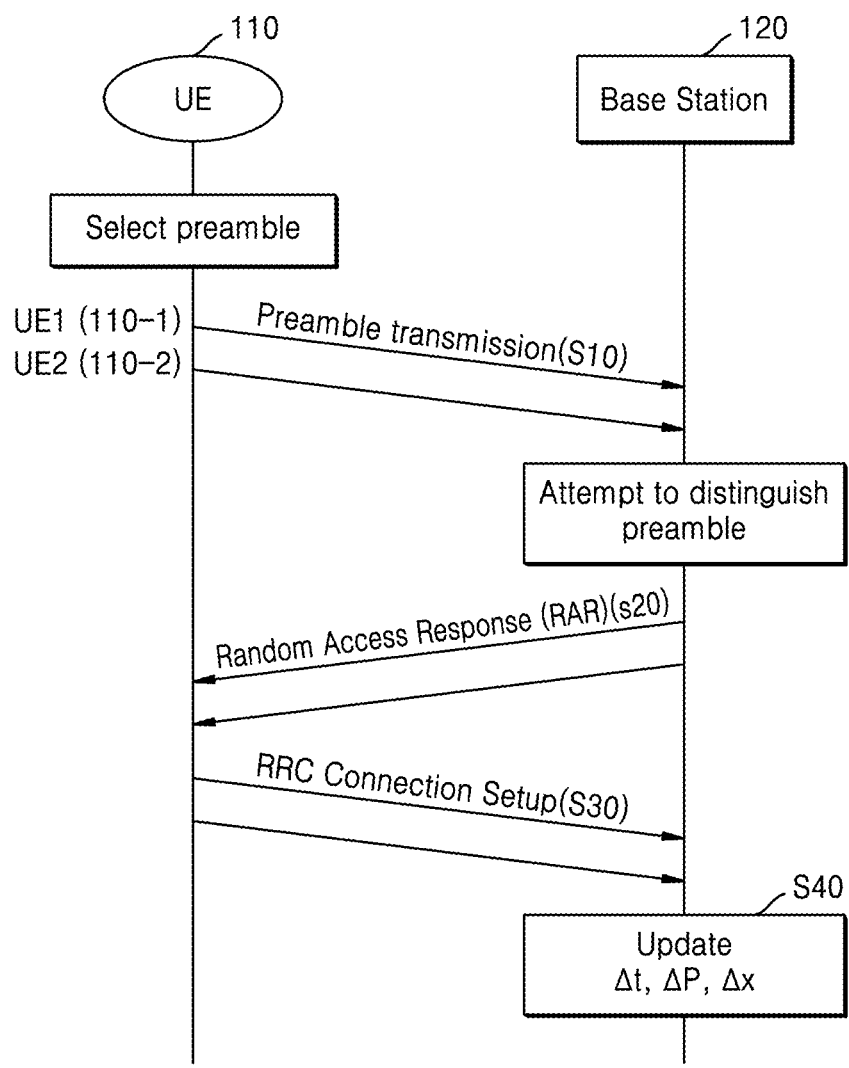
FIG. 3 shows a Random Access procedure according to an embodiment of the present disclosure.

FIG. 3 shows a Random Access procedure according to an embodiment of the present disclosure.

When the base station 120 receives a preamble from a UE 110 at the beginning of a RA process (S10) it uses the selected technique to attempt to distinguish between possible multiple devices UE1 (110-1), UE2 (110-2) that transmitted the same preamble at the same resources (S20).

Figure 2:
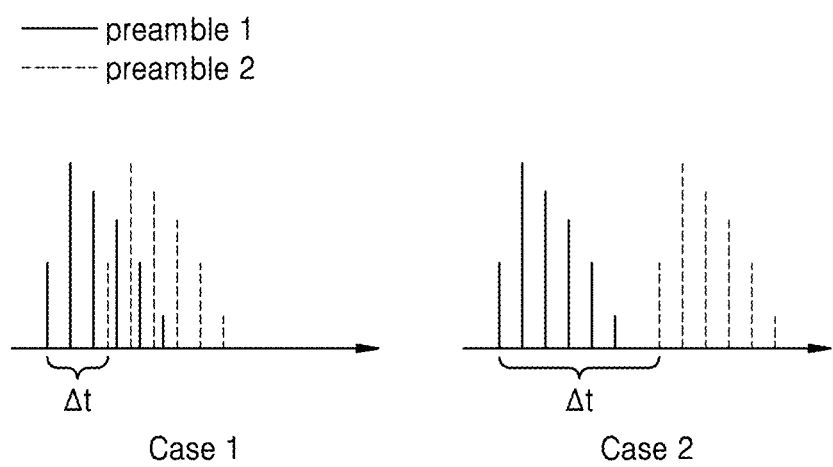
FIG. 2 shows an example of preamble separation in the time domain according to an embodiment of the present disclosure.

FIG. 2 shows an example of preamble separation in the time domain according to an embodiment of the present disclosure. An example of the preamble separation in the time domain is shown in FIG. 2.

Based on the number of identified preambles (e.g. 2, as shown in FIG. 3) the base station transmits an equal number of RARs (S30), each RAR for each identified preamble. The UEs 110-1, 110-2 then transmit the RRC Connection Setup message according to their equivalent RARs. If the number of RRC Connection Setup messages received is equal to the number of UEs determined in step S20, then the base station updates the minimum difference S40 to the minimum between the previous difference and the one identified this time. Otherwise the process proceeds with the normal collision resolution message to resolve any unidentified collisions. In FIG. 2, case 1 shows where Δt is not large enough to distinguish between the two preambles. However, in case 2, the signals of each preamble are significantly far apart in time and can be successfully distinguished. This allows the base station 120 to identify logical zone limits, based on which, similar preambles can be distinguished, as described in the following.

Figure 4:
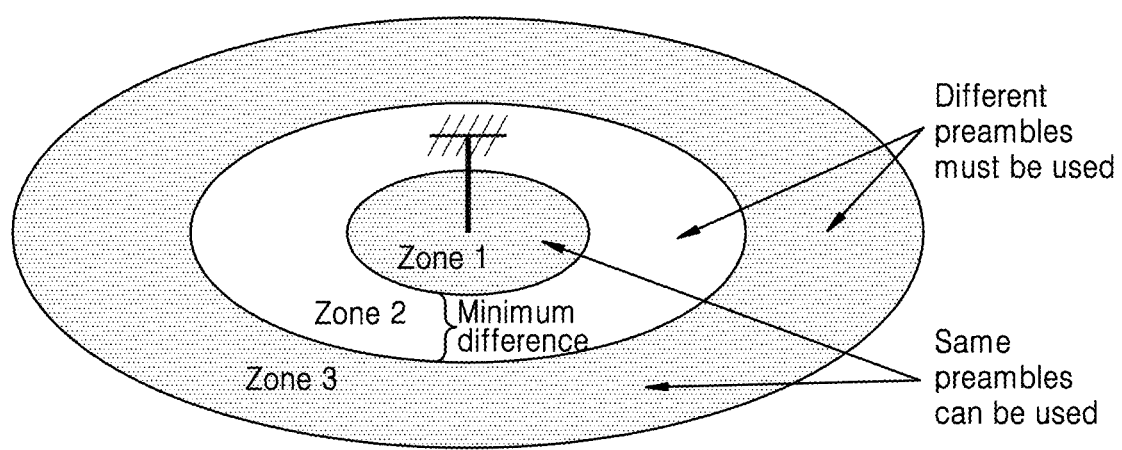
FIG. 4 shows an illustration of a coverage area of a cell split into a plurality of logical zones according to an embodiment of the present disclosure.

By continuously updating the minimum difference the base station can split the coverage area into different logical zones as illustrated in FIG. 4.

FIG. 4 shows an illustration of a coverage area of a cell split into a plurality of logical zones according to an embodiment of the present disclosure.

It is important to note that FIG. 4 is not intended to show a geographical or topological representation. Rather, each logical zone represents one way of grouping certain UEs together in a manner in which they can be distinguished from each other. When two or more zones are further apart than the minimum differences, then the same preambles can be used by the UEs among those zones, as even if they are transmitted at the same resources the base station will still be able to distinguish the preambles. In the example of FIG. 4, the same preambles may be used by UEs in Zone 1 and Zone 3, since they are separated by at least the minimum difference.

The base station 120 broadcasts the limits of the zones in one of the System Information Blocks (SIB). In an embodiment, SIB2 is used. The choice of SIB2 to carry the zone information is based on the fact that this SIB carries other information regarding cell access. However, any SIB deemed fit could also carry that information without changing the fundamental nature of the disclosure. Indeed any suitable message may be used to carry this information.

Although UEs from different zones that are further apart than the minimum difference can use the same preambles without the risk of colliding, UEs in the same zone will collide if they use the same preamble. To further decrease the number of collisions within the same zone, embodiments of the disclosure apply a method according to which the UEs do not choose the preamble at random with equal probability but, instead, they choose them probabilistically, based on the preamble usage of the near past.

In order to achieve this, an algorithm is provided according to an embodiment of the disclosure. The algorithm works as follows. A new value herein termed 'observing window' is used that defines the number of frames in the past that the base station takes into account for calculating the preamble usage. For each zone, the base station observes the preamble usage for a period of time, defined by the observing window. The base station then creates preamble usage reports (PURs) for each zone, based on the number of times that each preamble was used within the observing window period in the corresponding zone. The preamble usages are presented in cumulative ascending order. The UE selects a random number and selects a preamble based on the selected random number and the PUR.

FIG. 5 shows an example of a Preamble Usage Report (PUR) according to an embodiment of the present disclosure. FIG. 6 shows an example structure of an SIB (SIB2) according to an embodiment of the present disclosure.

An example of a PUR is shown in FIG. 5. For illustration purposes, the figure includes integer values to represent the preambles. In reality, as the skilled person will appreciate, the root Zadoff Chu sequence can be used, or any other value representative of the preamble. The PURs are also broadcasted in one of the SIBs. This can be the same SIB that carries the zone limits or a completely different one. As an example only, a new structure for SIB2 is shown in FIG. 6. The change to other possible definitions of SIB2 is shown in the final field, where a new filed "Zone Limits" is defined, as set out above.

Before attempting the RA process, devices decode the SIB or SIBs that carry the information for the zones and the PURs. By decoding the relevant SIB(s) that contain(s) the information about the zone limits, each UE can determine the zone it belongs to and retrieve the corresponding PUR. Based on the PUR of its zone, the UE probabilistically selects the preamble to use.

The size of the observing window plays a significant role in the preamble usage. Short windows may not accurately reflect the preamble usage, while long windows may result in significant storage and computation overhead at the base station without significant improvements on the number of collisions.

Deciding on the window value can be difficult, as the cell changes dynamically in terms of the number of UEs being served in total, the number of UEs in each zone and the frequency at which the UEs perform the RA process, amongst other factors. It is desirable that the observing window is dynamically updated to yield the best outcome in terms of preamble throughput (i.e. the ratio of the number of successful connections to the total number of connection attempts). To assist in this regard, a reinforcement learning algorithm is applied that attempts to achieve the highest preamble throughput by selecting the observing window value deemed best in a specific time.

Other evaluation metrics may be used in place of preamble throughput. For example, the number of observed collisions may be used instead. Other metrics may be used as appropriate, depending on how performance is to be measured in any particular instance.

An example of reinforcement learning is the Q-Learning algorithm, according to which a new state is selected in each step, and a reward is given based on the results of the new state. In this scenario, the different observing windows can be considered as the states, and the reward/penalty can be given based on whether a certain result (e.g. the number of successful connections over the total number of connection attempts) has been increased/decreased. An example of this approach is shown in FIG. 7.

Figure 7:
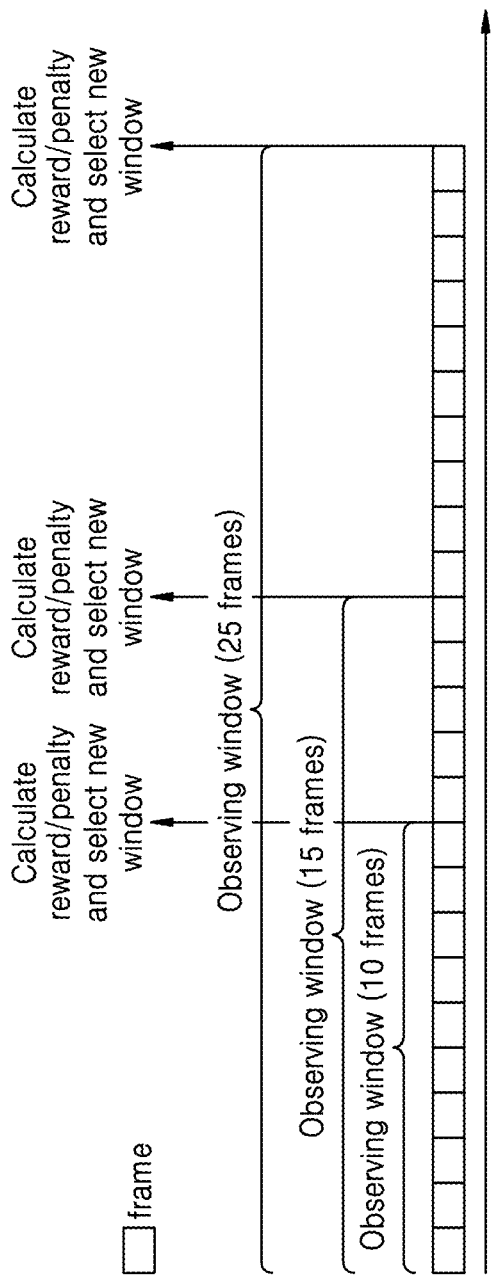
FIG. 7 shows example observing windows and an update procedure according to an embodiment of the present disclosure.

FIG. 7 shows example observing windows and an update procedure according to an embodiment of the present disclosure.

This shows the observing window that is used to produce the PURs, which changes dynamically based on the current state of the cell and the number of incoming connections. Initially the base station uses an observing window value of 10 frames. At the end of those frames the base station evaluates the preamble throughput (or any other evaluation metric that is selected by the base station), and updates the window accordingly. In this example, the base station selects to increase the observing window value to 15 frames. At the end of the 15 frames, it evaluates the preamble throughput again, and now decides to further increase the observing window to 25 frames.

Please note that Q-Learning is only one example of a reinforcement algorithm and other algorithms may also be used, as would be understood by a person skilled in the art. Other suitable learning algorithms include, but are not limited to, SARSA, DQN and DDPG.

The observing window value is dynamically updated and the PURs are produced based on the latest observing window value.

From the devices' point of view, the UEs do not need to know the value of the observing window as the PURs will be reflecting the preamble usages based on the current observing window length. However, the devices verify the zone they belong to before the start of the RA process as this may have changed from their last connection.

From the network's point of view, the base station determines the minimum difference so that it may split the coverage area into zones. Given the large number of UEs in a cell, it is expected that the base station will quickly converge to the global minimum difference. Furthermore, the base station computes the PURs for each zone and advertise them in one of the SIBS, along with the zone limits, as described previously. Therefore, a limited overhead is introduced in the base station. The space used both for the advertisement of the zone limits as well as the advertisement of the PURs, depends on the number of zones within the cell. For example, consider 3 zones in a cell where the zones are split based on the received power, then 120 bits are used (=15 bytes) to advertise the zones and their limits (8 bits for the zone number, 32 bits for the float number of the limit). The space used for the PURs can change based on the data structures used and the representation of the preambles in the PUR.

Furthermore, the resources used to transmit the SIB/SIBs that include the zone limits and the PURs depend on whether a new SIB will be used or not. Existing SIBs include fields that are currently unused, based on the idea that they might be needed in the future. If such a SIB is used, then no additional overhead is introduced. However, if a new SIB is used, then extra resources are periodically allocated for the transmission of the new SIB. Finally, if the new SIB is transmitted independently of the other SIBs, then its scheduling information is carried in either SIB1 or SIB2, using minimal overhead. If the new SIB is transmitted as part of the existing SI containers or an existing SIB is used, then no extra scheduling is used.

In the foregoing description, the use of PURs has been in the context of the modified RA process described in FIG. 3 and the associated text. However, as will be appreciated, PURs may be utilized in a telecommunication system where cell coverage area is not split into different logical zones. As such, PURS may find utility in cases where a cell coverage area is undivided and unitary. The benefits of the use of PURs may still be realized on an entire-cell basis by reducing collisions during the RA process.

In an entire-cell embodiment, the entire cell may be regarded as one of the logical zones referred to in the foregoing.

Figure 8:
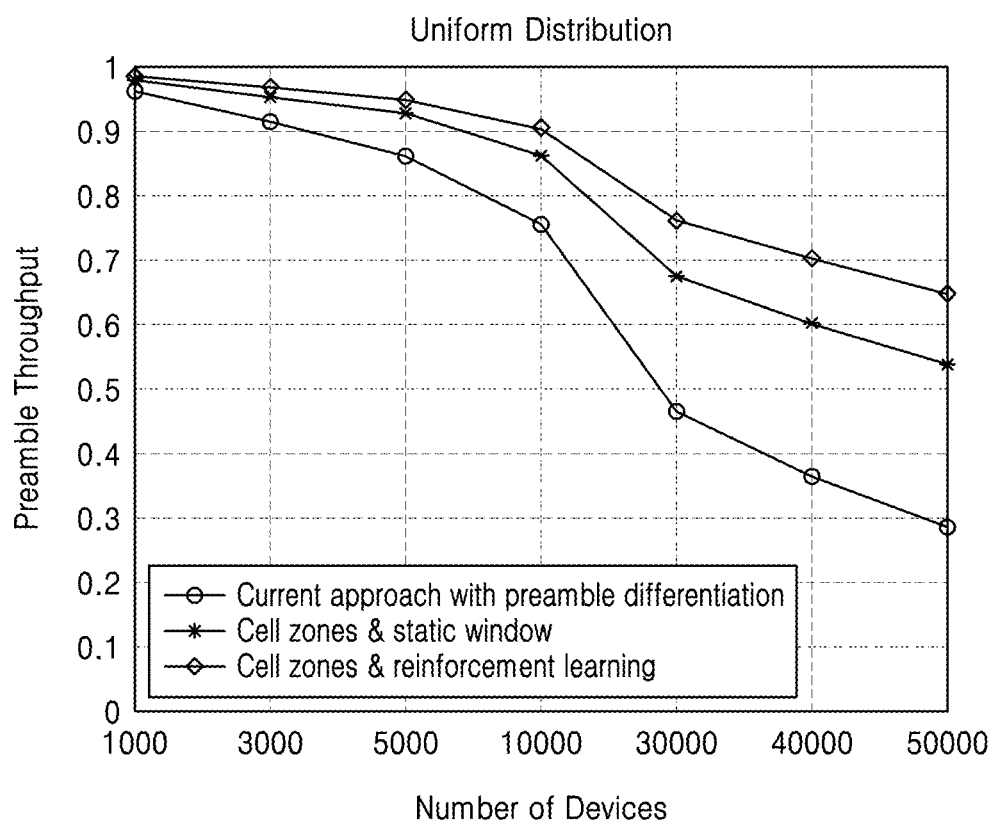
FIGS. 8 and 9 show graphical representations of the benefits of embodiments of the present disclosure in relation to preamble throughput.
Figure 9:
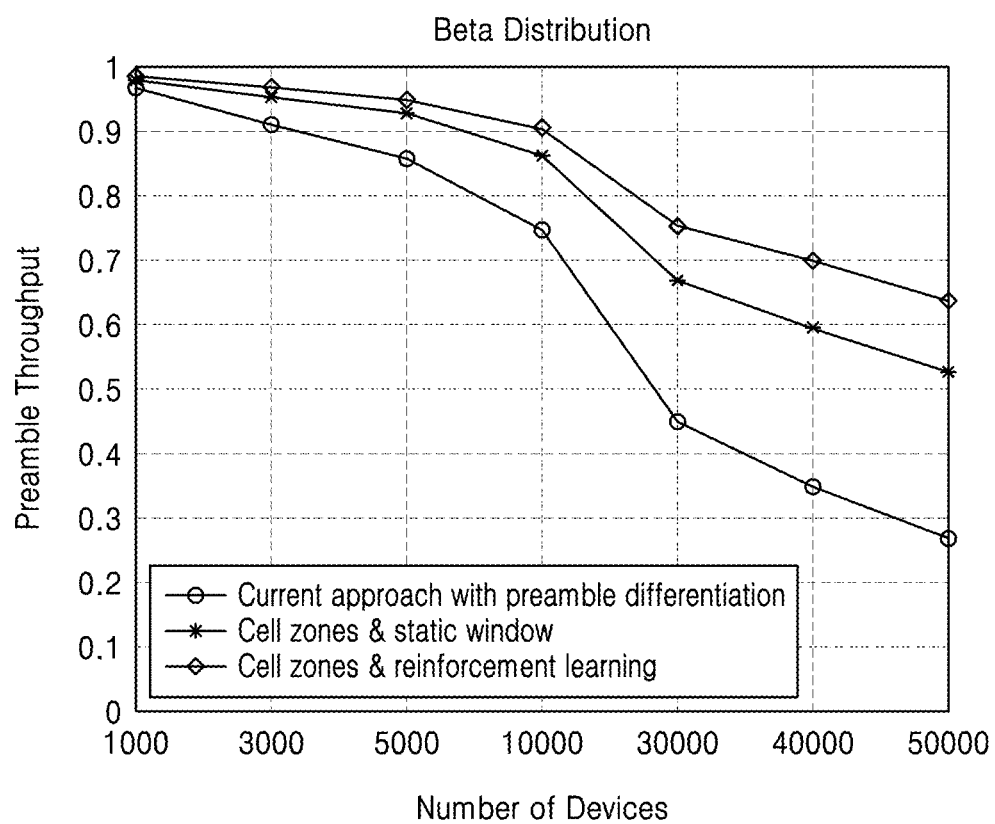

FIGS. 8 and 9 show graphical representations of the benefits of embodiments of the present disclosure in relation to preamble throughput. FIGS. 8 and 9 show, respectively, simulated results using a uniform and beta distribution as defined in 3GPP37.868. The simulation uses the most common MTC use cases and their respective periodicities (ER16).

In each case, the traditional result is shown in the trace marked with circular markers and "current approach with preamble differentiation". The result using different logical zones within a cell and a static window is shown with the star-shaped markers. The result using different logical zones within a cell and using reinforcement learning is shown using diamond-shaped markers.

The results show preamble throughput (i.e. the ratio of successful connections to total number of connection attempts) plotted against the number of devices. As expected, as the number of devices increases, the throughput falls in each case. However, using logical zones and a static window gives an improved performance over the traditional technique. Still further improvement is observed if a reinforcement learning technique is used in addition.

FIGS. 8 and 9 highlight clearly the advantages offered by embodiments of the present disclosure. As a further example, consider a case of a football stadium with 50,000 spectators. If traditional schemes are used, approximately 14,000 spectators will be able to establish a connection after the first attempt. The remaining 36,000 spectators will observe connection delays as they will have to attempt to connect at least once more. Even then, approximately 14,500 spectators will be able to connect on their second attempt leaving approximately 21,500 spectators in need for a third attempt, further increasing the delay experienced.

On the other hand, if an embodiment of the disclosure is utilized, approximately 32,500 spectators will be able to connect on their first attempt (i.e. 18,500 more spectators than in the traditional technique. In the second attempt, approximately 14,900 of the 17,500 spectators will be able to connect, leaving ~2,600 spectators to try for the third time, i.e. 18,900 spectators less than the traditional approach.

This graphically illustrates the benefits of using an embodiment of the present disclosure.

Using embodiments of the disclosure, UEs are able to successfully connect to the network with few attempts. This not only has benefits with regard to the delay experienced by the users, but also on the energy consumption of the devices. For any unsuccessful connection attempt, there are a number of messages that are exchanged in vain, as no connection could be established. Therefore the fewer the connection attempts the lower the number of messages that will be exchanged in vain, resulting in less energy use and so an increased battery life.

Figure 10:
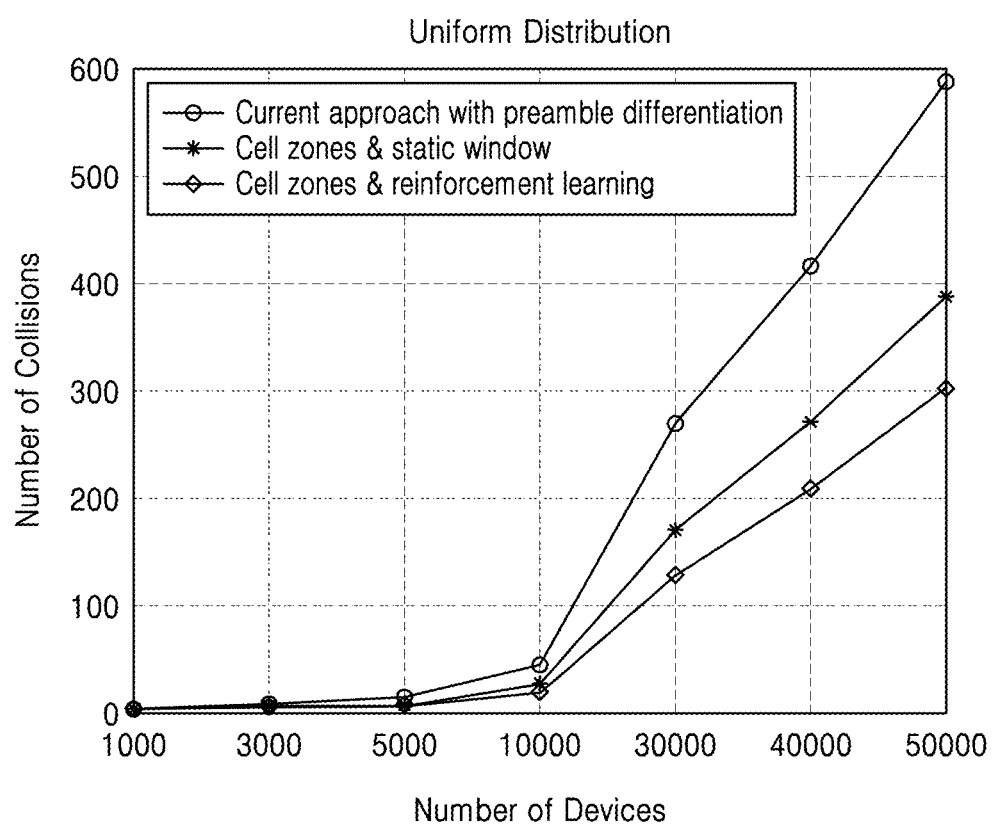
FIGS. 10 and 11 show graphical representations of the benefits of embodiments of the present disclosure in relation to the number of collisions.
Figure 11:
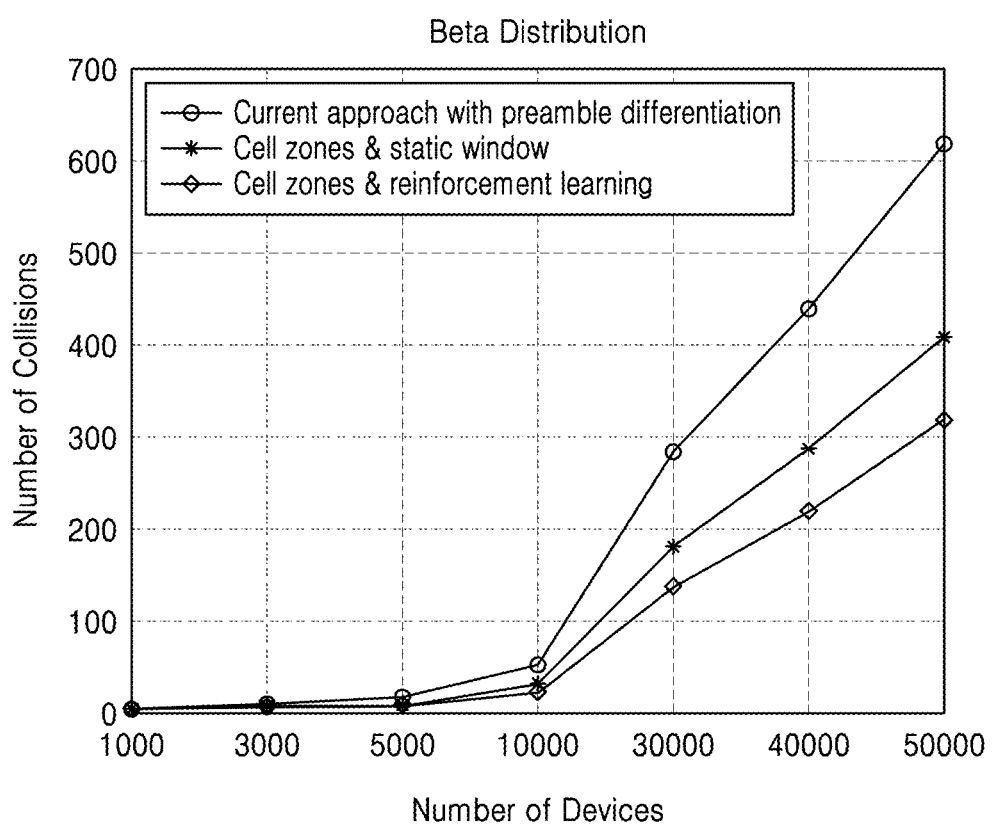

FIGS. 10 and 11 show graphical representations of the benefits of embodiments of the present disclosure in relation to the number of collisions.

FIGS. 10 and 11 illustrate the number of collisions at the first connection attempt, plotted against the number of UEs in a cell, using the same nomenclature as in FIGS. 8 and 9.

FIG. 10 shows a uniform distribution and FIG. 11 shows a beta distribution. The lower the number of collisions, the lower number of reconnection attempts and so, the longer the battery life for a particular UE.

Figure 12:
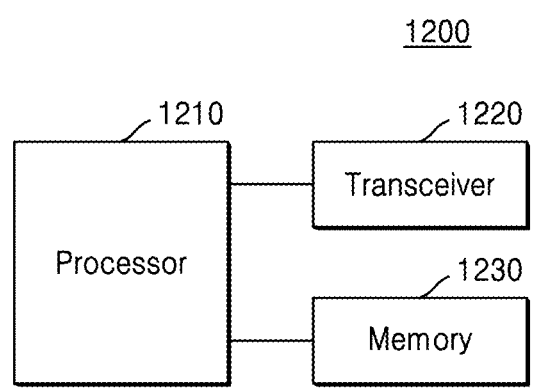
FIG. 12 illustrates a Base station according to embodiments of the present disclosure.

FIG. 12 schematically illustrates a Base station according to embodiments of the present disclosure.

Referring to the FIG. 12, the Base station 1200 may include a processor 1210, a transceiver 1220 and a memory 1230. However, all of the illustrated components are not essential. The Base station 1200 may be implemented by more or less components than those illustrated in FIG. 12. In addition, the processor 1210 and the transceiver 1220 and the memory 1230 may be implemented as a single chip according to another embodiment.

The aforementioned components will now be described in detail.

The processor 1210 may include one or more processors or other processing devices that control the proposed function, process, and/or method. Operation of the Base station 1200 may be implemented by the processor 1210.

The transceiver 1220 may include a RF transmitter for up-converting and amplifying a transmitted signal, and a RF receiver for down-converting a frequency of a received signal. However, according to another embodiment, the transceiver 1220 may be implemented by more or less components than those illustrated in components.

The transceiver 1220 may be connected to the processor 1210 and transmit and/or receive a signal. The signal may include control information and data. In addition, the transceiver 1220 may receive the signal through a wireless channel and output the signal to the processor 1210. The transceiver 1220 may transmit a signal output from the processor 1210 through the wireless channel.

The memory 1230 may store the control information or the data included in a signal obtained by the Base station 1200. The memory 1230 may be connected to the processor 1210 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices.

In one embodiment, the processor 1210 configured to receive two or more identical preambles transmitted from two or more User Equipments, determine by the base station, a minimum difference between the two or more preambles in a given domain, transmit a response message to each of the two or more UE which transmitted the identical preambles and receive a connection setup message using information included in the respective response message from each of the two or more UEs transmitting.

In one embodiment, the processor 1210 configured to continuously update the minimum difference on the basis of the determined minimum difference.

In one embodiment, the processor 1210 configured to transmit a preamble usage report periodically, wherein a preamble to transmit is selected by each of the two or more UEs based on the preamble usage report.

Figure 13:
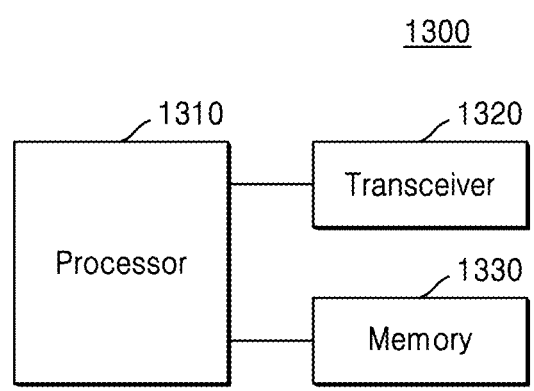
FIG. 13 illustrates a user equipment (UE) according to embodiments of the present disclosure.

FIG. 13 illustrates a user equipment (UE) according to embodiments of the present disclosure.

Referring to the FIG. 13, the UE 1300 may include a processor 1310, a transceiver 1320 and a memory 1330. However, all of the illustrated components are not essential. The UE 1300 may be implemented by more or less components than those illustrated in FIG. 13. In addition, the processor 1310 and the transceiver 1320 and the memory 1330 may be implemented as a single chip according to another embodiment.

The aforementioned components will now be described in detail.

The processor 1310 may include one or more processors or other processing devices that control the proposed function, process, and/or method. Operation of the UE 1300 may be implemented by the processor 1310.

The transceiver 1320 may include a RF transmitter for up-converting and amplifying a transmitted signal, and a RF receiver for down-converting a frequency of a received signal. However, according to another embodiment, the transceiver 1320 may be implemented by more or less components than those illustrated in components.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the UE 1300. The memory 1330 may be connected to the processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices.

Although the present disclosure has been described with reference to various embodiments, various changes and modifications may be suggested to one skilled in the art. It is intended that the present disclosure encompass such changes and modifications as fall within the scope of the appended claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for random access in a telecommunication system by a base station, the method comprising:
   identifying preamble usage information with respect to preambles received from at least two or more of user equipments (UEs) in a zone included in a cell coverage during an observing time window;
   transmitting, to a UE, the preamble usage information;
   receiving, from the UE, a preamble based on preamble usage information;
   transmitting, to the UE, a response message based on the preamble;
   receiving, from the UE, a connection setup message based on the response message
   identifying a minimum difference between zones based on at least one of a number of UEs, a number of connection setup messages, or at least two preamble received from the at least two or more UEs during the observing time window;
   identifying zone information including information with respect to the zone included in the cell coverage, wherein the zone is apart from another zone based on the minimum difference between zones; and
   transmitting, to the UE, the zone information.

2. The method of claim 1, wherein the zone information includes information of a plurality of logical zones within the cell coverage.

3. The method of claim 2, wherein the plurality of logical zones are identified such that preambles from one of the plurality of logical zones in the cell coverage are reused in another of the plurality of logical zones in the cell coverage.

4. The method of claim 2, wherein the plurality of logical zones are identified based on a Non Orthogonal Multiple Access (NOMA) or scheme utilizing Successive Interference Cancellation (SIC).

5. The method of claim 1, wherein the preamble usage information is transmitted periodically.

6. The method of claim 1, wherein the preamble usage information is transmitted in a System Information Block (SIB).

7. The method of claim 1,
   wherein the observing time window corresponds to at least one past number of frames, and
   wherein the preamble usage information is identified based on a number of times that the preambles have been used in the observing time window.

8. The method of claim 1, wherein a duration of the observing time window is adjusted dynamically based on a reinforcement learning algorithm.

9. The method of claim 1, wherein a duration of the observing time window is dynamically updated.

10. A base station for random access in a telecommunication system, the base station comprising:
    a transceiver;
    a processor; and
    a memory configured to store instructions that, when executed by the processor, cause the processor to:
      identify preamble usage information with respect to preambles received from at least two or more of user equipments (UEs) in a zone included in a cell coverage during an observing time window;
      control the transceiver to transmit, to a UE, the preamble usage information;
      control the transceiver to receive, from the UE, a preamble based on the preamble usage information;
      control the transceiver to transmit, to the UE a response message based on the preamble;
      control the transceiver to receive, from the UE, a connection setup message based on the response message;
      identify a minimum difference between zones based on at least one of a number of UEs, a number of connection setup messages, or at least two preamble received from the at least two or more UEs during the observing time window;
      identify zone information including information with respect to the zone included in the cell coverage, wherein the zone is apart from another zone based on the minimum difference between zones; and
      transmit, to the UE, the zone information.

11. The base station of claim 10, wherein the zone information includes information of a plurality of logical zones within a coverage area of a cell of the telecommunication system.

12. The base station of claim 11, wherein the plurality of logical zones are identified such that preambles from one of the plurality of logical zones in the cell coverage are reused in another of the plurality of logical zones in the cell coverage.

13. The base station of claim 11, wherein the plurality of logical zones are identified based on a Non Orthogonal Multiple Access (NOMA) or scheme utilizing Successive Interference Cancellation (SIC).

14. The base station of claim 10, wherein the preamble usage information is transmitted periodically.

15. The base station of claim 10, wherein the preamble usage information is transmitted in a System Information Block (SIB).

16. A method for random access in a telecommunication system by a user equipment (UE), the method comprising:
  receiving, from a base station (BS), preamble usage information with respect to preambles received from at least two or more of UEs in a zone included in a cell coverage during an observing time window;
  transmitting, to the BS, a preamble based on the preamble usage information;
  receiving, from the BS, a response message based on the preamble; and
  transmitting, to the BS, a connection setup message based on the response message;
  receiving, from the BS, zone information including information with respect to the zone included in the cell coverage, wherein the zone is apart from another zone based on a minimum difference between zones; and
  identifying information on the zone with respect to the UE based on the zone information,
  wherein the minimum difference between zones is identified based on at least one of a number of UEs, a number of connection setup messages, or at least two preambles received from the at least two or more UEs during the observing time window.

* * * * *

UNITED STATES PATENT AND TRADEMARK OFFICE
CERTIFICATE OF CORRECTION

| | |
|---|---|
| PATENT NO. | : 11,357,057 B2 |
| APPLICATION NO. | : 16/790468 |
| DATED | : June 7, 2022 |
| INVENTOR(S) | : Galini Tsoukaneri et al. |

It is certified that error appears in the above-identified patent and that said Letters Patent is hereby corrected as shown below:

On the Title Page

Column 1, Item (30), Line 2, "2000653" should read --2000653.2--.

Signed and Sealed this
Nineteenth Day of July, 2022

Katherine Kelly Vidal
*Director of the United States Patent and Trademark Office*